United States Patent Office 3,005,834
Patented Oct. 24, 1961

3,005,834
DEHYDRATION OF NUCLEAR HYDROXYLATED STEROIDS
Herman A. Drake, Galesburg, and Ralph B. Howard and Anne E. Fonken, Kalamazoo Township, Kalamazoo County, Mich., assignors to The Upjohn Company, Kalamazoo, Mich., a corporation of Michigan
No Drawing. Filed Apr. 29, 1957, Ser. No. 655,467
21 Claims. (Cl. 260—397.3)

This invention relates to a novel process for the dehydration of hydroxy steroids, and more particularly to the dehydration of nuclear hydroxy steroids of the androstane and pregnane series.

It is an object of the present invention to provide a novel process for effecting nuclear unsaturation in the steroid molecule. Another object is the provision of a process for the dehydration of nuclear hydroxylated steroids of the androstane and pregnane series. A further object is the provision of a process for the dehydration of esters of hydrocortisone. Other objects will be apparent in those skilled in the art to which this invention pertains.

In its broadest aspect, the present invention contemplates the molecular dehydration of a steroid nucleus i.e., chemical removal from the molecule of the elements of water at any position at which dehydration can occur from an appropriately hydroxylated starting steroid of the androstane and pregnane series. The process has been found broadly applicable in dehydrating hydroxy groups disposed variously about the steroid nucleus. It has thus been possible to produce a large number of unsaturated steroids which have themselves displayed remarkable physiologic activity or are useful as intermediates in the preparation of other physiologically active steroid compounds. Of outstanding importance for their activity are the $\Delta^{9(11)}$-steroids, e.g., 9(11)-dehydrodesoxycorticosterone acetate, 9(11)-dehydroprogesterone, 9(11)-dehydrotestosterone acetate, 9(11)-dehydroestradiol acetate, 9(11)-dehydro-17α-hydroxydesoxycorticosterone acetate, 9(11)-dehydro-17α-hydroxyprogesterone, etc. These compounds can be produced according to the process of the present invention from the corresponding 11α-hydroxy, 11β-hydroxy, or 9α-hydroxy steriods. Additionally, the $\Delta^{9(11)}$-steroids can be converted to intermediates which are useful in the production of other physiologically active steroids, e.g., 9(11)-dehydropregnenolone can be oxidized by the Oppenauer oxidation to 9(11)-dehydroprogesterone; 3-keto-9(11)-dehydro-4-etiocholenic acid by the method of Reichstein for the production of progesterone, to 9(11)-dehydroprogesterone; 9(11)-dehydrostigmastadienone, according to methods known for the production of progesterone from stigmastadienone, to 9(11)-dehydroprogesterone. In addition, 9(11) - dehydropregnanolone, 9(11) - dehydro-17α hydroxy-21-acetoxypregnane-3,20-dione, 9(11)-dehydro-21 - acetoxypregnane-3,20-dione, 9(11)-dehydro-17α-hydroxy-pregnane-3,20-dione, 9(11) - dehydroergostadienone, etc. are convertible, according to processes known in the art for the conversion of the corresponding 9-11-dihydro or 11-hydroxy compounds to physiologically active compounds, to the corresponding 9(11)-dehydro physiologically active compounds.

$\Delta^{9(11)}$-steroids are also useful in the production of 9α-chloro-11β-hydroxy and 9α-fluoro 11β-hydroxy analogs of the known physiologically active adrenal cortical and sex hormones, especially those possessing the $\Delta^4$-3,20-diketo functions also. [See Fried and Sabo, J. Am. Chem. Soc., 75, 2273 (1953)]. Hydrogenation of $\Delta^{9(11)}$-steroids is productive of the corresponding 9(11)-hydro compounds. These compounds are convertible to known and/or physiologically active steroids and intermediates thereto according to methods known in the art.

Of particular importance, either for their physiologic activity per se or as intermediates leading to the production of physiologically active steroids, are 4,9(11)-androstadiene-3,17-dione, 6 - methyl-4-pregnene-3,11,20-trione, 4,14-pregnadiene and 4,16-androstadien-3-one.

Heretofore, N-haloamides and N-haloimides, when employed in steroid chemistry, were used as oxidizing agents or halogenating agents, and in some instances, as both simultaneously. However, the use of these agents in a dehydration reaction was not known. The reaction of hydrocortisone acetate, with an N-haloamide or N-haloimide, under anhydrous conditions and in the presence of a base, i.e., pyridine, to produce an 11-keto group is the subject of U.S. Patent 2,751,402. The product of this reaction was cortisone acetate, i.e., the reaction was an oxidation reaction. In the prior art processes, the reaction product resulting from an oxidation with N-haloamides or N-haloimides was mixed with an aqueous reducing agent, e.g., aqueous sodium sulfite, to destroy the excess N-halo compound. The present invention, in contradistinction thereto, requires the use of an anhydrous form of sulfur dioxide to accomplish dehydration and to effect the decomposition of excess N-halo compound.

According to the process of the present invention, a nuclear hydroxylated steroid of the androstane or pregnane series is contacted under anhydrous conditions and in a basic nonreacting organic medium with an N-haloamide or an N-haloimide and a form of anhydrous sulfur dioxide, the thus formed dehydrated steroid then being separated from the reaction mixture. The precise mechanism by which the results of this invention are obtained have not been conclusively defined, but it is speculated that there is first produced a hypohalite. This reaction is quite rapid, frequently requiring less than five minutes. If the reaction is substantially anhydrous and an anhydrous form of sulfur dioxide added, the intermediate hypohalite is believed to be converted to a halosulfonate group as indicated by the following formulas, using an 11-hydroxy steroid as the starting material:

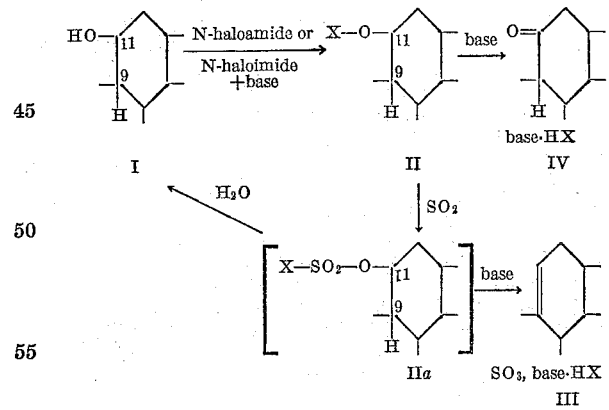

If water is added or is present at this stage, the hydroxy group (I) is apparently regenerated. The halo sulfonate group (IIa) is unstable in the presence of the base and, according to this postulation, promptly rearranges to produce unsaturation (III).

If, however, the addition of the sulfur dioxide is unduly delayed, most of the intermediate hypohalite (II) appears to rearrange to produce the keto steroid (IV). Heretofore the latter reaction has been regarded as that expected from the addition of an N-haloamide or N-haloimide to a hydroxy steroid.

The spontaneous rearrangement of the hypohalite group to a keto group in the presence of base appears to be a function of time. For example, in the reaction of hydrocortisone acetate with N-bromoacetamide at room temperature in the presence of pyridine, no significant amount of cortisone acetate is produced if the sulfur dioxide is added within about two hours after the mixture of the N-bromoacetamide with the hydrocortisone acetate. The oxidation reaction is self-catalyzing. At the end of three hours, approximately forty percent cortisone acetate is produced, by four hours, about 65 percent; and by seven hours, between eighty and 95 percent. A high yield of the unsaturated product therefore requires that the sulfur dioxide be added within about two hours after the mixture of the steroid and N-haloamide or N-haloimide, although this time may vary with the particular starting steroid.

The steroid hypohalite is prepared ordinarily by the reaction of the hydroxy steroid with an N-haloamide or N-haloimide wherein the halogen has an atomic weight from 35 to 127, inclusive, i.e., chlorine, bromine, or iodine, preferably chlorine or bromine, or other reagent capable of converting a hydroxy compound to a hypohalite. Examples of such compounds are N-chloroacetamide, N-bromoacetamide, N-chlorosuccinimide, N-bromosuccinimide, N-iodosuccinimide, N-bromophthalimide, 3-bromo-5,5-dimethylhydantoin and 1,3-dibromo-5,5-dimethylhydantoin. Ordinarily, an amount in excess of a molar equivalent, calculated on the starting hydroxy steroid, is employed. If there are other groups in the molecule which are susceptible to oxidation or dehydration, corresponding greater amounts of the N-halo compound should be employed to achieve optimum yields.

The reaction of the hydroxy steroid with the N-halo compound is conducted in the presence of a basic organic compound substantially unaffected by either material. Examples of such bases are the tertiary amines whose amino nitrogen is a member of an aromatic ring, for example, the pyridines, i.e., pyridine and the alkyl pyridines, e.g., picoline, lutidine, collidine, conyrine, parvuline, etc., and the lower-fatty acid amides, especially formamide, methylformamide, and dimethylformamide. It is probable that a complex of some of the above compounds is formed with sulfur dioxide, but this does not adversely affect their utility as a medium for the primary reaction or as a means for effectively removing hydrogen halide as it is formed in the course of such reaction. The base is preferably employed in a molar excess, calculated on the starting hydroxy steroid, e.g., ten molar equivalents, and is preferably the sole reaction solvent.

The reaction of the hydroxy steroid with the N-halo compound is conducted under anhydrous conditions. The term anhydrous when used herein means that the reaction mixture contains less than about one molar equivalent of water, calculated on the steroid. If a molar equivalent or more of water is contained in the reaction mixture, substantially no dehydrated steroid is produced. The less water in the reaction mixture, the greater the yield of dehydrated steroid. The reaction mixture preferably contains less than 0.1 molar equivalent of water.

The reaction of an N-haloamide or N-haloimide with a hydroxy steroid is primarily operable between minus forty degrees centigrade and plus seventy degrees centigrade, the lower limit being determined by the solubility of the reactants and a suitably short reaction time and the upper limit being determined by the amount of side reactions which normally accompany a reaction involving N-halo compounds at higher temperatures. Ordinarily, room temperature is preferred for convenience and for the consistently high yields of desired product which are obtained at this temperature.

The reaction time is primarily determined by the rate at which the thus-produced hypohalite rearranges to produce a keto group. Use of higher than room temperatures will reduce the maximum reaction time and the use of lower temperatures will increase it. In most instances, the reaction between the hydroxy group and the N-halo compound is substantially complete within one-half hour at room temperature and, in the case of hydrocortisone acetate at least, is complete in less than five minutes.

The conversion of a steroid hypohalite to the dehydrated steroid apparently involves the reaction of the hypohalite group with an anhydrous form of sulfur dioxide in the presence of an organic base as described. The anhydrous sulfur dioxide can be in the form of gaseous or liquid sulfur dioxide or in the form of a material which, in situ, produces sulfur dioxide, as, for example, an alkali-metal hyposulfite.

The reaction between the hypohalite group and sulfur dioxide, as stated before, apparently produces a halosulfonate which, under the anhydrous conditions and in the presence of the base, is converted to the dehydrated steroid, sulfur trioxide and a hydrohalide salt of the base. The reaction temperature range is substantially the same as described for the preparation of the hypohalite. The reaction in most instances appears to be instantaneous and the reaction product can be isolated almost immediately. Longer reaction times appear to have little or no adverse effect upon the yield.

As previously indicated, the process of this invention is broadly applicable to dehydration of nuclear hydroxylated steroids of the androstane and pregnane series. Substituent groups other than hydroxy located at various positions about the steroid nucleus appear to have no effect on the basic operation of the process. It is thus possible by the present process to produce steroid compounds unsaturated at the 1–2, 2–3, 3–4, 4–5, 5–6, 6–7, 7–8, 8–9, 8–14, 9–11, 11–12, 14–15, 15–16, and 16–17 positions merely by selection of appropriately hydroxylated starting materials.

A large number of examples are provided to indicate the broad applicability of the process of this invention as well as to point up certain variations in procedure which may be introduced without detracting substantially from the results. The examples which follow are illustrative of the process and products of the invention but are not to be construed as limiting.

EXAMPLE 1

*Dehydration of hydrocortisone acetate*

To a solution of 104.7 grams of 11β,17α-dihydroxy-21-acetoxy-4-pregnene-3,20-dione dissolved in 1047 milliliters of dry pyridine at 25 degrees centigrade was added 39.4 grams of N-bromoacetamide and the mixture stirred for fifteen minutes at 25 degrees centigrade in a nitrogen atmosphere. The mixture was cooled to twelve degrees centigrade and anhydrous sulfur dioxide was added until a negative test was obtained with acidified potassium iodide-starch paper. There was then added 2094 milliliters of deionized water dropwise. The temperature of the solution was maintained at below thirty degrees centigrade during the addition. The stirred mixture was maintained at twelve degrees for one-half hour and then maintained at between zero and five degrees centigrade for eighteen hours. The precipitated steroid was filtered, washed with water and the filter cake dried in a vacuum oven at 100 degrees centigrade until a constant weight was obtained. There was thus obtained 96.3 grams, a yield of 96.3 percent of the theoretical, of 17α-hydroxy-21-acetoxy-4,9(11)-pregnadiene-3,20-dione. Melting point, 232.5 to 238 degrees centigrade; [α]$_D$ plus 127.4 degrees (chloroform).

EXAMPLE 2

*Dehydration of hydrocortisone acetate*

To a solution of twenty grams (0.049 mole) of hydrocortisone acetate dissolved in 200 milliliters of dry pyridine, maintained at 25 degrees centigrade, was added 13.68 grams (0.099 mole) of N-bromoacetamide. The mixture was stirred at 25 degrees centigrade for one hour while protecting the mixture from light. The solution was then cooled to twelve degrees centigrade and dry sulfur dioxide was bubbled into the mixture until a negative test was obtained with acidified KI-starch paper. The temperature of the mixture was kept below thirty degrees centigrade during the addition. A precipitate appeared during the addition. There was then added 400 milliliters of deionized water to the mixture dropwise while maintaining the temperature of the mixture below thirty degrees centigrade. Stirring was maintained at twelve degrees centigrade for one-half hour and then at about zero degrees centigrade in a refrigerator for about sixteen hours. The precipitate was filtered, washed with water, and then dried in a vacuum oven at sixty to seventy degrees centigrade to a constant weight. There was thus obtained 19.02 grams, a yield of 95 percent of the theoretical, of pyridine solvated 17α-hydroxy-21-acetoxy-4,9(11)-pregnadiene-3,20-dione. Melting point, 231.5 to 237.5 degrees centigrade; [α]$_D$ plus 113 degrees (chloroform); papergram analysis indicated slight traces of hydrocortisone acetate and cortisone acetate as the only products other than the desired 17α-hydroxy-21-acetoxy-4,9(11)-pregnadiene-3,20-dione.

Following exactly the procedure outlined above but substituting 11α,17α-dihydroxy-21-acetoxy-4-pregnene-3,20-dione as the starting material, there was produced 17α-hydroxy-21-acetoxy-4,9(11)-pregnadiene-3,20-dione. In a similar manner, pregnane-3α,11β,20-triol was dehydrated to 9(11)-pregnene-3,20-dione, and 6β,11α-dihydroxyprogesterone was converted to 4,6,9(11)-pregnatriene-3,20-dione.

EXAMPLES 3–13

Dehydration of hydrocortisone acetate

Hydrocortisone acetate was dehydrated to 17α-hydroxy-21-acetoxy-4,9(11)-pregnadiene-3,20-dione, according to the procedure described in Example 2, with the variations listed below, one of which was introduced in each reaction:

(3) The reaction mixture, after the addition of the sulfur dioxide was maintained at 25 degrees centigrade for sixteen hours before the water was added.
(4) The N-bromoacetamide was replaced by 1,3-dibromo-5,5-dimethylhydantoin.
(5) The N-bromoacetamide was replaced by N-chlorosuccinimide.
(6) The N-bromoacetamide was replaced by N-iodosuccinimide.
(7) The sulfur dioxide was added five minutes after the addition of the N-bromoacetamide.
(8) Lutidine instead of pyridine was used as the reaction solvent.
(9) The sulfur dioxide was replaced with sodium hyposulfite ($Na_2S_2O_4$).
(10) The reaction was exposed to the direct light of a standard 150 watt tungsten filament light bulb maintained within one foot of the wall of the Pyrex glass reaction flask.
(11) The pyridine was replaced by dimethylformamide.
(12) The pyridine was replaced as the reaction solvent by tertiary butyl alcohol containing about sixteen molar equivalents, calculated on the starting steroid, of pyridine. In this reaction, the yield of 17α-hydroxy-21-acetoxy-4,9(11)-pregnadiene-3,20-dione was substantially lower than the reaction employing pyridine as the solvent.
(13) Otherwise like Example 12, other reactions were performed in which the pyridine was replaced as the reaction solvent with pyridine mixed with one of each of the following solvents: acetone, ethyl acetate, ethylene dichloride, acetonitrile, benzene and nitrobenzene. The yield of 17α-hydroxy-21-acetoxy-4,9(11)-pregnadiene-3,20-dione when using acetone, ethyl acetate or ethylene dichloride was lowered.

EXAMPLE 14

Dehydration of hydrocortisone acetate

Hydrocortisone acetate was converted to 17α-hydroxy-21-acetoxy-4,9(11)-pregnadiene-3,20-dione following the procedure described in Example 2 with the following exception: the pyridine, N-bromoacetamide and sulfur dioxide were mixed together prior to the addition of the hydrocortisone acetate. Although there was heat liberated during the mixing of the reagents, the efficacy of the mixture in producing the dehydrations did not appear to be affected. In other reactions, this mixture was maintained for up to sixteen hours before the addition of the hydrocortisone acetate without destruction of the reagents.

EXAMPLE 15

Dehydration of 11α-hydroxypyrogesterone

To a solution of ten grams (0.03 mole) of 11α-hydroxyprogesterone dissolved in 100 milliliters of pyridine was added 8.35 grams (0.06 mole) of N-bromoacetamide while maintaining the mixture at 25 degrees centigrade. The mixture was stirred for one hour while protecting it from light. The mixture was then cooled to eighteen degrees centigrade and dry sulfur dioxide was bubbled into the mixture until a negative test was obtained with acidified KI-starch paper. Then 200 milliliters of deionized water was added dropwise to the mixture while maintaining the temperature below thirty degrees centigrade. The mixture was cooled to twelve degrees centigrade for one-half hour and then at about zero degrees centigrade for about sixteen hours to precipitate a portion of the steroidal product. The precipitate was filtered, washed with water and then dried to constant weight in a vacuum oven at sixty to seventy degrees centigrade. There was thus obtained 6.32 grams, a yield of 67.5 percent of the theoretical, of 9(11)-dehydroprogesterone. Melting point, 125 to 127.5 degrees centigrade; [α]$_D$ plus 160.2 degrees (acetone).

Following the procedure described in Example 15, 11β-hydroxyprogesterone is also dehydrated to 9(11)-dehydroprogesterone.

EXAMPLE 16

Dehydration of hydrocortisone acetate

To a solution of fifty milliliters of pyridine (redistilled from barium oxide) was added 4.04 grams (0.010 mole) of hydrocortisone acetate and the resulting solution cooled to 25 degrees centigrade. A solution of 2.76 grams (0.020 mole) of N-bromoacetamide in fifteen milliliters of pyridine was then added and the combined solution stirred for thirty minutes at 25 degrees centigrade. Thereafter the solution was cooled to twelve degrees centigrade and dry sulfur dioxide was added until a negative test was obtained with acidified potassium iodide-starch paper. At this point 200 milliliters of water was added dropwise with constant stirring, the temperature of the mixture being maintained below thirty degrees centigrade. The resulting slurry was then cooled to 0–5 degrees centigrade and maintained at such temperatures for four hours. The precipitate was filtered, washed with water and dried in a vacuum oven at 100 degrees centigrade to constant weight. A yield of 3.35 grams of 17α-hydroxy-21-acetoxy-4,9(11)-pregnadiene-3,20-dione was obtained. Melting point, 225.5 to 231.5 degrees centigrade; [α]$_D$ plus 128 degrees (chloroform); paper chromatographic and infrared analyses consistent with the structure.

EXAMPLE 17

Dehydration of hydrocortisone acetate

Instead of adding first the N-bromoacetamide and then the sulfur dioxide to the hydrocortisone acetate solution (as in Example 16 above), 5.5 grams (0.040 mole) of N-bromoacetamide in thirty milliliters of pyridine was treated with sulfur dioxide until a negative test was obtained with acidified potassium iodide-starch paper and the mixture then combined with 4.04 grams of hydrocortisone acetate in fifty milliliters of redistilled pyridine at 25 degrees centigrade. The resulting mixture was stirred for 45 minutes, cooled to twelve degrees centigrade, and 200 milliliters of water added dropwise. After cooling to 0–5 degrees centigrade for four hours, the precipitate was filtered, washed with water and dried in a vacuum oven at 100 degrees centigrade to constant weight. A yield of 3.58 grams of 17α-hydroxy-21-acetoxy-4,9(11)-pregnadiene-3,20-dione was obtained. Melting point, 230.5 to 236 degrees centigrade; $[\alpha]_D$ plus 128 degrees (chloroform); the structure was confirmed by paper chromatograph and infrared analysis.

EXAMPLE 18

*Oxidation of 3α-hydroxypregnane-11,20-dione*

Following exactly the procedure of Example 16 but substituting twenty milligrams of 3α-hydroxypregnane-11,20-dione as the starting material, there was produced a crude yield of 8.9 milligrams of pregnane-3,11,20-trione, identified by paper chromatographic and infrared analyses.

EXAMPLE 19

*Dehydration of 3α-hydroxypregnane-11,20-dione*

Following exactly the procedure of Example 17 but substituting twenty milligrams of 3α-hydroxypregnane-11,20-dione as the starting material, there was produced a crude yield of 24 milligrams of 3-pregnene-11,20-dione as identified by its infrared spectrum, which indicated also no residual hydroxyl.

EXAMPLE 20

*Dehydration of 5α-hydroxy-6-methylpregnane-3,11,20-trione*

To a solution of 7.50 kilograms of 5α-hydroxy-6-methylpregnane-3,11,20-trione in 71.5 liters of redistilled and dried pyridine at room temperature was added 6.950 kilograms of N-bromoacetamide. The resulting mixture was stirred for one-half hour at 25 degrees centigrade and cooled to zero degrees centigrade, the mixture then being maintained at 0–10 degrees centigrade during addition of 42.5 pounds of sulfur dioxide gas. The mixture was warmed to 25 degrees centigrade and stirred for 1½ hours and then cooled to 0–5 degrees centigrade. At this point, 53 gallons of aqueous sulfuric acid solution (ten percent by volume) cooled to zero degrees centigrade was added, followed by 9.5 gallons of water with stirring which was continued for about three hours. The resulting solids were filtered and washed thoroughly with water and dried to constant weight at sixty degrees centigrade under vacuum. A yield of 6.484 kilograms (90.7 percent of theoretical) of 6β-methyl-4-pregnene-3,11,20-trione was obtained. Melting point, 162.5 to 165 degrees centigrade; $[\alpha]_D$ plus 207 degrees (chloroform); $E_{max239}=16,067$.

EXAMPLE 21

*Dehydration of 6β-hydroxy-11-ketoprogesterone*

Following exactly the procedure of Example 16 but substituting 10.3 milligrams of 6β-hydroxy-11-ketoprogesterone as the starting material, there was produced a crude yield of 9.5 milligrams of product. According to paper chromatographs, no 6β-hydroxy-11-ketoprogesterone was present in the product and 4,6-pregnadiene-3,11,20-trione was identified by infrared analysis, which indicated absorption at 1698 cm.$^{-1}$ (nonconjugated ketone); 1650 cm.$^{-1}$ (conjugated ketone); and 1620, 1586 cm.$^{-1}$ ($\Delta^{4,6}C=C$), all consistent with the structure.

EXAMPLE 22

*Dehydration of 6β-hydroxy-11-ketoprogesterone*

Following exactly the procedure of Example 17 but substituting 6β-hydroxy-11-ketoprogesterone as the starting material, there was produced 4,6-pregnadient-3,11,20-trione. Infrared analysis was consistent with the structure and identical with that indicated for the same product in Example 21 above.

EXAMPLE 23

*Dehydration of 6β-hydroxy-5β-pregnane-3,11,20-trione*

Following exactly the procedure of Example 16 but substituting 10.8 milligrams of 6β-hydroxy-5β-pregnane-3,11,20-trione as the starting material, there was produced a crude yield of 8.1 milligrams of 6-pregnene-3,11,20-trione. Infrared analysis showed trace of residual hydroxyl and strong nonconjugated ketone.

EXAMPLE 24

*Dehydration of 6β-hydroxy-5β-pregnane-3,11,20-trione*

Following exactly the procedure of Example 17 but substituting 10.8 milligrams of 6β-hydroxy-5β-pregnane-3,11,20-trione as the starting material, there was produced a crude yield of 11.0 milligrams of 6-pregnene-3,11,20-trione. Infrared analysis showed trace of residual hydroxyl and strong nonconjugated ketone.

EXAMPLE 25

*Dehydration of 7β-hydroxy-4-androstene-3,17-dione*

Following exactly the procedure of Example 16 but substituting 9.7 milligrams of 7β-hydroxy-4-androstene-3,17-dione as the starting material, there was produced 6.8 milligrams of crude product. The major product was 4,6-androstadiene-3,17-dione. Infrared analysis, consistent with the structure, showed absorption at: 1730 cm.$^{-1}$ (17-ketone); 1657 cm.$^{-1}$ (conjugated ketone; 1615, 1580 cm.$^{-1}$ (conjugated C=C). Ultraviolet analysis indicated absorption at 283 mmu ($\Delta^{4,6}C=C$).

EXAMPLE 26

*Dehydration of 7β-hydroxy-4-androstene-3,17-dione*

Following exactly the procedure of Example 17 but substituting 7β-hydroxy-4-androstene-3,17-dione as the starting material, there was produced 4.3 milligrams of crude 4,6-androstadiene-3,17-dione. Infrared analysis was consistent with the structure and identical with that indicated for the same product in Example 25 above.

EXAMPLE 27

*Dehydration of 9α-hydroxyprogresterone*

Following exactly the procedure of Example 16 but substituting 9.9 milligrams of 9α-hydroxyprogresterone for the starting material, there was produced 3.0 milligrams of crude 9(11)-dehydroprogesterone. Paper chromatographic and infrared analyses were consistent with the structure, absorption being as follows; 1695 cm.$^{-1}$ (20-ketone); 1668 cm.$^{-1}$ (conjugated ketone); 1611 cm.$^{-1}$ ($\Delta^4C=C$).

EXAMPLE 28

*Dehydration of 9α-hydroxyprogresterone*

Following exactly the procedure of Example 17 but substituting 19.8 milligrams of 9α-hydroxyprogesterone as the starting material, there was produced a crude yield of 14.3 milligrams of 9(11)-dehydroprogesterone. Paper chromatographic and infrared analyses were consistent with the structure, giving results identical with those indicated in Example 27 above for the same product.

EXAMPLE 29

*Dehydration of 11α-hydroxyprogesterone*

Following exactly the procedure of Example 16 but substituting 19.8 milligrams of 11α-hydroxyprogesterone as the starting material, there was produced 12.4 milligrams of crude 9(11)-dehydroprogesterone. Paper chromatographic and infrared analyses were consistent with the structure, giving results identical with those indicated in Example 28 above for the same product.

EXAMPLE 30

*Dehydration of 11β,17α-dihydroxy-21-acetoxy-1,4-pregnadiene-3,20-dione*

A mixture of 0.53 gram (1.32 millimoles) of 11β,17α-dihydroxy-21-acetoxy-1,4,-pregnadiene-3,20-dione and 365 milligrams (2.64 millimoles) of N-bromoacetamide in three milliliters of pyridine was stirred in the dark for thirty minutes. A stream of anhydrous sulfur dioxide was then passed over the stirred mixture, while cooling it to about room temperature, until a potassium iodide-starch test was negative. The mixture was then mixed with 25 milliliters of ice water and stirred for thirty minutes. The precipitated solid was filtered, washed with water and dried to give 17α-hydroxy-21-acetoxy-1,4,9(11)-pregnatriene-3,20-dione which, when crystallized from acetone, melted at 210 to 215 degrees centigrade. Recrystallization of these crystals from acetone gave a product melting at 220 to 222 degrees centigrade, having $E_{max240}=15,750$, an infrared absorption spectrum consistent with the structure, and the analysis below:

Calculated for $C_{23}H_{28}O_5$: C, 71.85; H, 7.34. Found: C, 72.10; H, 7.66.

Following the above procedure but substituting other 21-esters of 11β,17α,21-trihydroxy-1,4-pregnadiene-3,20-dione, e.g., 11β,17α-dihydroxy-21-acyloxy-1,4-pregnadiene-3,20-dione wherein the acyl radical is that of a hydrocarbon carboxylic acid containing from one to twelve carbon atoms, inclusive, as the starting steroid in the reaction, there are produced other 21-esters of 17α,21-dihydroxy-1,4,9(11)-pregnatriene-3,20-dione.

EXAMPLE 31

*Dehydration of 2-methyl-11β,17α-dihydroxy-21-acetoxy-4-pregnene-3,20-dione*

A mixture of one gram (2.38 millimoles) of 2-methyl-11β,17α-dihydroxy-21-acetoxy-4-pregnene-3,20-dione, 662 milligrams (two equivalents) of N-bromoacetamide and six milliliters of pyridine was stirred in the dark for thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After crystallization from acetone there was obtained 0.82 gram, a yield of 85 percent of the theoretical, of 2-methyl-17α-hydroxy-21-acetoxy-4,9(11)-pregnadiene-3,20-dione as colorless needles melting at 212 to 217 degrees centigrade. A sample recrystallized from a mixture of acetone and methylene chloride melted at 220 to 223 degrees centigrade; $[\alpha]_D$ plus 138 degrees (chloroform); an infrared absorption spectrum consistent with the structure. Analysis was as follows:

Calculated for $C_{24}H_{32}O_5$: C, 71.97; H, 8.05. Found: C, 72.05; H, 8.32.

Following the above procedure but substituing another 21-ester of a 2-lower-alkyl-11β,17α,21-trihydroxy-4-pregnene-3,20-dione, e.g., an ester disclosed in copending application S.N. 485,318, especially the 2-methyl-11β,17α-dihydroxy-21-acyloxy-4-pregnene-3,20-diones wherein the acyl radical is that of a hydrocarbon carboxylic acid containing from one to twelve carbon atoms, inclusive, as starting steroid in the reaction, there are produced other 21-esters of 2-methyl-17α,21-dihydroxy-4,9(11)-pregnadiene-3,20-dione and 2-lower-alkyl homologs thereof.

EXAMPLE 32

*Dehydration of 6α-methyl-11β,17α,21-trihydroxy-1,4-pregnadiene-3,20-dione 21-acetate*

To a solution of 530 milligrams of 6α-methyl-11β,17α,21-trihydroxy-1,4-pregnadiene-3,20-dione 21-acetate (1-dehydro-6α-methylhydrocortisone 21-acetate) in five milliliters of pyridine, in an atmosphere of nitrogen, was added 225 milligrams of N-bromoacetamide. After standing at room temperature under nitrogen for a period of thirty minutes, the reaction solution was cooled to ten to fifteen degrees centigrade and, with shaking, sulfur dioxide gas was passed over the surface until the solution gave no color with acidified starch-iodine paper. During the addition of sulfur dioxide gas, the reaction mixture became warm. The temperature was kept under thirty degrees centigrade by external cooling and by varying the rate of sulfur dioxide addition. After standing at room temperature for a period of fifteen minutes, the reaction mixture was poured into thirty milliliters of ice water and the resulting gummy precipitate extracted with fifty milliliters of ether. The ether extract was washed with five percent hydrochloric acid solution and water, dried over anhydrous sodium sulfate, and evaporated to dryness to give 371 milligrams of material. This material was recrystallized from acetone-Skellysolve B (hexane hydrocarbons) to give 318 milligrams of 6α-methyl - 17α,21 - dihydroxy-1,4,9(11)-pregnatriene-3,20-dione 21-acetate of melting point 188 to 191.5 degrees centigrade.

EXAMPLE 33

*Dehydration of 6α-methyl-11β,17α,21-trihydroxy-4-pregnene-3,20-dione 21-acetate*

Following the same manner exactly as in Example 32, 6α - methyl-11β,17α,21-trihydroxy-4-pregnene-3,20-dione 21-acetate was treated with N-chlorosuccinimide to give the corresponding intermediate hypochlorite, i.e., 6α-methyl - 11β,17α,21-trihydroxy-1,4-pregnadiene-3,20-dione 11β-hypochlorite 21-acetate, which was then treated with gaseous sulfur dioxide to give 6α-methyl-17α,21-dihydroxy-4,9(11)-pregnadiene-3,20-dione 21-acetate.

EXAMPLE 34

*Dehydration of 6α-methyl-11β,17α-dihydroxy-4-pregnene-3,20-dione*

A mixture of one gram of 6α-methyl-11β,17α-dihydroxy-4-pregnene-3,20-dione, 650 milligrams of N-bromoacetamide and six milliliters of pyridine was stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After crystallization from acetone there was obtained about 0.8 gram of 6α-methyl-17α-hydroxy-4,9(11)-pregnadiene-3,20-dione.

EXAMPLE 35

*Dehydration of 11β-hydroxy-4-androstene-3,17-dione*

To a stirred solution of 100 grams of 11β-hydroxy-4-androstene-3,17-dione in one liter of dry pyridine was added, at room temperature and in a nitrogen atmosphere, sixty grams of N-bromoacetamide all at once. The resulting mixture was stirred for fifteen minutes and then cooled to ten degrees centigrade. Into the cooled solution was bubbled sulfur dioxide gas until the mixture gave a negative test with acidified potassium iodide-starch paper. The mixture was diluted with four liters of water and cooled to about zero degrees centigrade for three hours. There was thus precipitated 4,9(11)-androstadiene-3,17-dione which, after filtering, washing with water and drying, weighed eighty grams and melted at 197 to 203 degrees centigrade.

EXAMPLE 36

*Dehydration of 11β-hydroxy-17-methyl-testosterone*

To a stirred solution of one gram of 11β-hydroxy-17- methyltestosterone in ten milliliters of dry pyridine was added, portionwise at 25 degrees centigrade and in a nitrogen atmosphere, 0.5 gram of N-bromoacetamide. Stirring was continued for fifteen minutes, the mixture then cooled to ten degrees centigrade and sulfur dioxide gas was bubbled into the cool solution until a negative test with acidified potassium iodide-starch paper was obtained. Ten milliliters of water was then added to the mixture followed by a mixture of fifteen milliliters of concentrated hydrochloric acid mixed with 25 grams of ice. The precipitated solid was separated, washed with water, dried and then crystallized first from a mixture of methylene chloride and Skellysolve B (hexane hydrocarbons) and then from dilute acetone to give 9(11)-dehydro-17-methyltestosterone melting at 170 to 172 degrees centigrade.

EXAMPLE 37

*Dehydration of 6α-methyl-11β-hydroxyprogesterone*

A mixture of one gram of 6α-methyl-11β-hydroxyprogesterone, 650 milligrams of N-bromoacetamide and six milliliters of pyridine was stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added and the mixture was maintained at about five degrees centigrade for thirty minutes. The precipitated white solid was filtered, washed with water and dried under vacuum. After crystallization from acetone there was obtained about 0.8 gram of 6α-methyl-4,9(11)-pregnadiene-3,20-dione.

EXAMPLE 38

*Dehydration of 1-dehydro-6α-methyl-11β-hydroxyprogesterone*

A mixture of one gram of 1-dehydro-6α-methyl-11β-hydroxyprogesterone, 650 milligrams of N-bromoacetamide and six milliliters of pyridine was stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After crystallization from acetone there was obtained about 0.75 gram of 6α-methyl-1,4,9-(11)-pregnatriene-3,20-dione.

EXAMPLE 39

*Dehydration of 6-methyl-11β,17α-dihydroxy-21-fluoro-1,4-pregnadiene-3,20-dione*

A mixture of one gram of 6-methyl-11β,17α-dihydroxy-21-fluoro-1,4-pregnadiene-3,20-dione, 650 milligrams of N-bromoacetamide and six milliliters of pyridine was stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After crystallization from acetone there was obtained about 0.7 gram of 6-methyl-17α - hydroxy - 21 - fluoro - 1,4,9(11) - pregnatriene-3,20-dione.

EXAMPLE 40

*Dehydration of 6α-methyl-11β,17α-dihydroxy-1,4-pregnadiene-3,20-dione*

A mixture of one gram of 6α-methyl-11β,17α-dihydroxy-1,4-pregnadiene-3,20-dione, 650 milligrams of N-bromoacetamide and six milliliters of pyridine was stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After crystallization from acetone there was obtained about 0.75 gram of 6α-methyl-17α-hydroxy-1,4,9(11)-pregnatriene-3,20-dione.

EXAMPLE 41

*Dehydration of 14α-hydroxyprogesterone*

Following exactly the procedure of Example 16 but substituting 9.9 milligrams of 14α-hydroxyprogesterone as the starting material, there was produced 8.6 milligrams of crude 14(15)-dehydroprogesterone. Infrared analysis was consistent with the structure, showing no residual hydroxyl and absorption as follows: 1695 cm.$^{-1}$ (20-ketone); 1668 cm.$^{-1}$ (conjugated ketone); 1611 cm.$^{-1}$ ($\Delta^4$ C=C).

EXAMPLE 42

*Dehydration of 14α-hydroxyprogesterone*

Following exactly the procedure of Example 17 but substituting 9.9 milligrams of 14α-hydroxyprogesterone as the starting material, there was produced a crude yield of 7.5 milligrams of 14(15)-dehydroprogesterone. Infrared analysis was consistent with the structure and identical with that indicated for the same product in Example 41 above.

EXAMPLE 43

*Dehydration of 14α-hydroxy-1-dehydroprogesterone*

Following exactly the procedure of Example 16 but substituting 19.6 milligrams of 14α-hydroxy-1-dehydroprogesterone as the starting material, there was produced a crude yield of 15.5 milligrams of 1,14(15)-dehydroprogesterone. Paper chromatographic analysis indicated no starting material present in the final product. Infrared analysis was consistent with the structure and showed absorption as follows: 1690, 1688 cm.$^{-1}$ (nonconjugated ketone); 1652 cm.$^{-1}$ (conjugated ketone); 1618, 1597 cm.$^{-1}$ ($\Delta^{1,4}$ C=C).

EXAMPLE 44

*Dehydration of 14α-hydroxy-1-dehydroprogesterone*

Following exactly the procedure of Example 17 but substituting 9.8 milligrams of 14α-hydroxy-1-dehydroprogesterone as the starting material, there was produced a crude yield of 8.1 milligrams of 1,14(15)-dehydroprogesterone. Infrared analysis was consistent with the structure and identical with that indicated for the same product in Example 43 above.

EXAMPLE 45

*Dehydration of 15α-hydroxyprogesterone*

Following exactly the procedure of Example 16 but substituting 9.9 milligrams of 15α-hydroxyprogesterone as the starting material, there was produced 7.3 milligrams of product. Paper chromatographic examination indicated a trace of 15-hydroxyprogesterone remaining; infrared analysis was consistent with the structure of 14(15)-dehydroprogesterone and identical with that indicated for the same product in Example 41.

EXAMPLE 46

*Dehydration of 15α-hydroxyprogesterone*

Following exactly the procedure of Example 17 but substituting 9.9 milligrams of 15α-hydroxyprogesterone as the starting material, there was produced 9.8 milligrams of product. Paper chromatographic examination indicated some pyridine-sulfur dioxide complex, and infrared analysis was consistent with the structure of 14(15)- dehydroprogesterone and identical with that indicated for the same product in Example 41.

EXAMPLE 47

*Dehydration of 15α-hydroxy-4-androstene-3,17-dione*

Following exactly the procedure of Example 17 but substituting 36.2 milligrams of 15α-hydroxy-4-androstene-3,17-dione as the starting material, there was produced a crude yield of 10.8 milligrams of 4,14(15)-androstadiene-3,17-dione. Infrared analysis indicated a trace of residual hydroxyl and was consistent with the structure, showing absorption as follows: 1730 cm.$^{-1}$ (nonconjugated ketone); 1660 cm.$^{-1}$ ($\Delta^4$ 3-ketone); 1615 cm.$^{-1}$ ($\Delta^4$ C=C).

EXAMPLE 48

*Dehydration of testosterone*

Following exactly the procedure of Example 16 but substituting 8.7 milligrams of testosterone as the starting material, there was produced a crude yield of 7.2 milligrams of 4,16-androstadien-3-one. Infrared analysis showed no residual hydroxyl and was consistent with the structure, showing absorption as follows: 1670 cm.$^{-1}$ ($\Delta^4$ 3-ketone); 1615 cm.$^{-1}$ ($\Delta^4$ C=C).

EXAMPLE 49

*Dehydration of testosterone*

Following exactly the procedure of Example 17 but substituting 8.7 milligrams of testosterone as the starting material, there was produced 6.4 milligrams of product. Infrared analysis was consistent with the structure of and identical with that indicated for the same product in Example 48 above.

It is apparent from the preceding examples that the method of the present invention is broadly applicable to dehydration of nuclear hydroxylated steroids of the androstane and pregnane series. The constitution of the remainder of the starting steroid molecule has proved to have little effect on the operability of the process. It is necessary that anhydrous conditions be observed and that the reaction be carried out in the presence of a basic non-reacting organic medium, but changes in reaction time and temperature as well as variation in the concentration of the reactants may be tolerated without appreciably altering the normal operation of the process. As illustrated in Examples 16 and 17 and the later-appearing examples dependent thereon, it is immaterial whether the starting steroid and N-halo compound are premixed and the sulfur dioxide added thereto, or whether the N-halo compound is first contacted with the sulfur dioxide and the resulting mixture then added to the starting steroid.

In the claims which follow, by "basic nonreacting organic medium" is meant a medium as hereinbefore described that is nonreacting as to the starting steroids and the N-haloamides and N-haloimides. The medium does react, however, with the hydrogen halide as the latter is formed in the course of dehydration and thereby prevents collateral halogenation of the steroid molecule. In addition, it is probable that a complex is formed with sulfur dioxide and some of the media previously described.

The term "sulfur dioxide" is not to be limited to the use of sulfur dioxide per se but is to be taken as also including all means by which sulfur dioxide can be formed in situ.

This application is a continuation-in-part of application S.N. 498,738 of Drake et al., filed April 1, 1955, now abandoned.

It is to be understood that the invention is not to be limited to the exact details of operation or specific compounds shown and described herein, as obvious modifications and equivalents will be apparent to one skilled in the art; the invention is therefore to be limited only by the scope of the appended claims.

We claim:

1. A process for dehydrating nuclear hydroxylated steroids selected from the group consisting of steroids of the androstane series and pregnane series which comprises: contacting the hydroxy steroid, under anhydrous conditions and in a basic non-reacting organic medium, with (1) a compound selected from the group consisting of N-haloamides and N-haloimides and (2) anhydrous sulfur dioxide, the said anhydrous sulfur dioxide being added before total oxidation of the reactive hydroxyl group has occurred.

2. A process for dehydrating nuclear hydroxylated steroids of the androstane series which comprises: contacting the hydroxy steroid, under anhydrous conditions and in a basic non-reacting organic medium, with (1) a compound selected from the group consisting of N-haloamides and N-haloimides and (2)) anhydrous sulfur dioxide, the said anhydrous sulfur dioxide being added before total oxidation of the reactive hydroxyl group has occurred.

3. A process for dehydrating nuclear hydroxylated steroids of the androstane series which comprises: contacting the hydroxy steroid, under anhydrous conditions and in a basic non-reacting organic medium, with (1) a N-haloamide and (2) anhydrous sulfur dioxide, the said anhydrous sulfur dioxide being added before total oxidation of the reactive hydroxyl group has occurred.

4. The process of claim 3 in which the basic non-reacting organic medium is a member selected from the group consisting of tertiary amines wherein the amino nitrogen is a member of an aromatic ring, lower fatty acid amides and mixtures thereof.

5. The process of claim 3 in which the basic non-reacting organic medium is pyridine and the N-haloamide is N-bromoacetamide.

6. A process for preparing 4,9(11)-androstadiene-3,17-dione which comprises: contacting a compound selected from the group consisting of 9α-hydroxy-4-androstene-3,17-dione, 11α-hydroxy-4-androstene-3,17-dione, and 11β-hydroxy-4-androstene-3,17-dione, under anhydrous condition and in the presence of pyridine, with (1) N-bromoacetamide and (2) anhydrous sulfur dioxide, the said anhydrous sulfur dioxide being added before total oxidation of the reactive hydroxyl group has occurred, to give 4,9(11)-androstadiene-3,17-dione.

7. A process for dehydrating nuclear hydroxylated steroids of the androstane series which comprises: contacting the hydroxy steroid, under anhydrous conditions and in a basic non-reacting organic medium, with (1) a N-haloimide and (2) anhydrous sulfur dioxide, the said anhydrous sulfur dioxide being added before total oxidation of the reactive hydroxyl group has occurred.

8. The process of claim 7 in which the basic non-reacting organic medium is a member selected from the group consisting of tertiary amines wherein the amino nitrogen is a member of an aromatic ring, lower fatty acid amides and mixtures thereof.

9. The process of claim 7 in which the basic non-reacting organic medium is pyridine and the N-haloimide is N-chlorosuccinimide.

10. A process for dehydrating nuclear hydroxylated steroids of the pregnane series which comprises: contacting the hydroxy steroid, under anhydrous conditions and in a basic non-reacting organic medium, with (1) a compound selected from the group consisting of N- haloamides and N-haloimides and (2) anhydrous sulfur dioxide, the said anhydrous sulfur dioxide being added before total oxidation of the reactive hydroxyl group has occurred.

11. A process for dehydrating nuclear hydroxylated steroids of the pregnane series which comprises: contacting the hydroxy steroid, under anhydrous conditions and in a basic non-reacting organic medium, with (1) a N-haloamide and (2) anhydrous sulfur dioxide, the said anhydrous sulfur dioxide being added before total oxidation of the reactive hydroxyl group has occurred.

12. The process of claim 11 in which the basic non-reacting organic medium is a member selected from the group consisting of tertiary amines wherein the amino nitrogen is a member of an aromatic ring, lower fatty acid amides and mixtures thereof.

13. The process of claim 11 in which the basic non-reacting organic medium is pyridine and the N-haloamide is N-bromoacetamide.

14. A process for preparing 17α-hydroxy-21-acetoxy-4,9(11)-pregnadiene-3,20-dione which comprises: contacting a compound selected from the group consisting of 9α,17α-dihydroxy-21-acetoxy-4-pregnene-3,20-dione, 11α,17α-dihydroxy-21-acetoxy-4-pregnene-3,20-dione, and 11β,17α-dihydroxy-21-acetoxy-4-pregnene-3,20-dione, under anhydrous conditions and in the presence of pyridine, with (1) N-bromoacetamide and (2) anhydrous sulfur dioxide, the said anhydrous sulfur dioxide being added before total oxidation of the reactive hydroxyl group has occurred, to give 17α-hydroxy-21-acetoxy-4,9(11)-pregnadiene-3,20-dione.

15. A process for preparing 6β-methyl-4-pregnene-3,11,20-trione which comprises: contacting 5α-hydroxy-6-methylpregnane-3,11,20-trione, under anhydrous conditions and in the presence of pyridine, with (1) N-bromoacetamide and (2) anhydrous sulfur dioxide, the said anhydrous sulfur dioxide being added before total oxidation of the reactive hydroxyl group has occurred, to give 6β-methyl-4-pregnene-3,11,20-trione.

16. A process for dehydrating nuclear hydroxylated steroids of the pregnane series which comprises: contacting the hydroxy steroid, under anhydrous conditions and in a basic non-reacting organic medium, with (1) a N-haloimide and (2) anhydrous sulfur dioxide, the said anhydrous sulfur dioxide being added before total oxidation of the reactive hydroxyl group has occurred.

17. The process of claim 16 in which the basic non-reacting organic medium is a member selected from the group consisting of tertiary amines wherein the amino nitrogen is a member of an aromatic ring, lower fatty acid amides and mixtures thereof.

18. The process of claim 16 in which the basic non-reacting organic medium is pyridine and the N-haloimide is N-chlorosuccinimide.

19. A process for the production of 17α-hydroxy-21-acetoxy-4,9(11)-pregnadiene-3,20-dione which comprises the steps of (1) mixing, in pyridine under anhydrous conditions, 11β,17α-dihydroxy-21-acetoxy-4-pregnene-3,20-dione with at least a molar equivalent of N-bromoacetamide at a temperature between about 20 and about 30° C. for less than 3 hours and (2) adding anhydrous gaseous sulfur dioxide to the reaction mixture, before total oxidation of the reactive hydroxyl groups has occurred, to produce 17α-hydroxy-21-acetoxy-4,9(11)-pregnadiene-3,20-dione.

20. A process for the production of 17α-hydroxy-21-acetoxy-4,9(11)-pregnadiene-3,20-dione which comprises the steps of (1) mixing, in pyridine under anhydrous conditions, 11α,17α-dihydroxy-21-acetoxy-4-pregnene-3,20-dione with at least a molar equivalent of N-bromoacetamide at a temperature between about 20 and about 30° C. for less than three hours and (2) adding anhydrous gaseous sulfur dioxide to the reaction mixture, before total oxidation of the reactive hydroxyl groups has occurred to produce 17α-hydroxy-21-acetoxy-4,9(11)-pregnadiene-3,20-dione.

21. The process for producing 17α-hydroxy-21-lower-acyloxy-4,9(11)-pregnadiene-3,20-dione which comprises: mixing, under anhydrous conditions 11,17α-dihydroxy-21-lower-acyloxy-4-pregnene-3,20-dione with N-bromoacetamide for a period of time less than that required to give about a 50% yield of the corresponding 11-keto compound; and decomposing the intermediately produced compound with anhydrous sulfur dioxide, all in the presence of pyridine.

References Cited in the file of this patent

UNITED STATES PATENTS

| | | |
|---|---|---|
| 2,728,783 | Graber et al. | Dec. 27, 1955 |
| 2,837,517 | Herr | June 3, 1958 |
| 2,842,568 | Herz et al. | July 8, 1958 |
| 2,867,632 | Lincoln et al. | Jan. 6, 1959 |
| 2,867,633 | Lincoln et al. | Jan. 6, 1959 |
| 2,867,635 | Lincoln et al. | Jan. 6, 1959 |
| 2,867,636 | Lincoln et al. | Jan. 6, 1959 |
| 2,873,272 | Fonken et al. | Feb. 10, 1959 |
| 2,883,401 | Babcock et al. | Apr. 21, 1959 |